United States Patent [19]
Upton

[11] Patent Number: 6,050,598
[45] Date of Patent: Apr. 18, 2000

[54] APPARATUS FOR AND METHOD OF MONITORING THE MASS QUANTITY AND DENSITY OF A FLUID IN A CLOSED CONTAINER, AND A VEHICULAR AIR BAG SYSTEM INCORPORATING SUCH APPARATUS

[75] Inventor: Eric L. Upton, Redondo Beach, Calif.

[73] Assignee: TRW Inc., Redondo Beach, Calif.

[21] Appl. No.: 09/166,061

[22] Filed: Oct. 2, 1998

[51] Int. Cl.[7] .................................................. B60R 21/16
[52] U.S. Cl. ............................. 280/735; 73/451; 324/654
[58] Field of Search ................................... 280/735, 734; 73/32 R, 149, 444, 451; 324/654

[56] References Cited

U.S. PATENT DOCUMENTS

| | | | |
|---|---|---|---|
| 2,691,296 | 10/1954 | DeGiers | 73/451 |
| 3,071,971 | 1/1963 | Wallace | 73/451 |
| 3,332,289 | 7/1967 | Weichselbaum et al. | 73/451 |
| 3,587,398 | 6/1971 | Dawes | 73/451 |
| 5,415,033 | 5/1995 | Maresca, Jr. et al. | 73/40.5 R |
| 5,434,389 | 7/1995 | Griebel | 324/624 |
| 5,550,478 | 8/1996 | Kopera | 324/654 |
| 5,824,885 | 10/1998 | Lekholm | 73/444 |
| 5,844,502 | 12/1998 | Perez et al. | 324/654 |

*Primary Examiner*—Lanna Mai
*Assistant Examiner*—Lynda Jasmin
*Attorney, Agent, or Firm*—Michael S. Yatsko

[57] ABSTRACT

Apparatus for monitoring the mass quantity and density of a fluid in a closed container of fixed volume. A density sensor within the closed container has a density such that the density sensor moves to a first location within the container when the fluid has at least a predetermined density, which corresponds with a predetermined mass quantity of the fluid within the closed container, but moves to a second location within the closed container when the fluid has a density less than the predetermined density. A detector monitors the position of the density sensor. The apparatus can be incorporated into a vehicular air bag system to monitor the density, and thus the mass quantity, of the gas which is to deploy the air bag in the event of an impact. A method of filling a closed container with a predetermined mass quantity of a fluid includes providing in the container a density sensor having a density such that the density sensor floats on the fluid when the fluid has a density corresponding with the predetermined mass quantity of the fluid in the volume of the closed container, monitoring the position of the density sensor within the container, and filling the container with the fluid until the density sensor floats on the fluid.

30 Claims, 2 Drawing Sheets

APPARATUS FOR AND METHOD OF MONITORING THE MASS QUANTITY AND DENSITY OF A FLUID IN A CLOSED CONTAINER, AND A VEHICULAR AIR BAG SYSTEM INCORPORATING SUCH APPARATUS

BACKGROUND OF THE INVENTION

The present invention pertains to an apparatus for monitoring the density, and thus the mass quantity of a fluid within a closed container. The present invention further pertains to a method of filling a container with a fluid to a predetermined mass quantity. Additionally, the present invention relates to an improved air bag system for an automotive vehicle, including a sensor and an indicator for providing an indication of leakage of the propellant gas with which the air bag is to be filled.

The density of a fluid in a closed container of fixed volume is proportional to the mass quantity of the fluid in the container. Therefore, monitoring the density of the fluid permits determination of the mass quantity of the fluid in the fixed volume. Monitoring of the density of a fluid which is under a high pressure in a closed container preferably is done without penetrating the closed container, so as to avoid leakage of the fluid from the container.

In many applications, the monitoring need only provide an indication of whether the density, and thus the mass quantity, are sufficiently high; i.e., an indication of whether the density or the mass quantity is above or below a predetermined value. In such applications, use of a two state monitoring apparatus is appropriate. In other applications, a more precise monitoring might be desired, providing a more accurate indication of the fluid density and mass quantity.

Many vehicular air bag systems include a canister of propellant gas for inflating the air bag if an impact is sensed. The mass quantity of this propellant gas should be monitored to assure that a sufficient mass quantity of the gas is present to inflate the air bag properly in the event an impact is sensed. Monitoring of the propellant gas density, to assure that the propellant gas maintains at least a specified density, is one way of monitoring the mass quantity of the gas. A drop in the propellant gas density can indicate a drop in the mass quantity of the gas within its container, which might be due to leakage of the gas from the container. Such leakage can result in the vehicle air bag system no longer having enough of the gas, and so result in the air bag not inflating satisfactorily in the event of an impact. Since many automotive vehicles are used for several years without activation of the air bag system, the propellant gas may leak over the life of the vehicle and the air bag system. Thus, monitoring the density of the propellant gas is desirable to permit detection of gas leakage to an inappropriate level.

A container of pressurized fluid which is expected to have a lengthy life is preferably filled with a mass quantity of the fluid exceeding the lowest acceptable mass quantity so that, despite minor leakage, the container will maintain at least the acceptable mass quantity of the fluid over its expected life, or at least over a significant portion of that life. The mass quantity can be monitored by monitoring the density of the fluid within the container, and so it is desirable to be able to monitor two fluid density levels within the container of fluid. The first density level is the density level corresponding with the lowest acceptable mass quantity of the fluid in the container, and the second density level is the density level corresponding with the mass quantity to which the container of fluid is to be filled at the time it is manufactured or refilled. In other applications, monitoring of several density levels may be desirable.

SUMMARY OF THE INVENTION

In one aspect, the present invention is an apparatus for monitoring the mass quantity and density of a pressurized fluid within a closed container. A density sensor within the closed container has a density such that the density sensor moves to a first location within the closed container when the density of the fluid is at least a predetermined density which corresponds with a predetermined mass quantity of the fluid within the closed container, but moves to a second location within the closed container when the density of the fluid is less than the predetermined density. A detector monitors the position of the density sensor within the closed container.

In another aspect, the present invention incorporates the above apparatus for monitoring the density and mass quantity of a pressurized fluid in a closed container into a vehicular air bag system in which the apparatus indicates whether the container contains a sufficient mass quantity of the pressurized propellant fluid to inflate the air bag satisfactorily should an impact be sensed. The air bag system includes an air bag, an impact sensor, and a closed container of fixed volume for holding a predetermined mass quantity of the propellant fluid at a pressure causing the fluid to have at least a predetermined density. The closed container includes a valve coupled to the air bag and to the impact sensor. When the impact sensor senses an impact, the valve opens to release the propellant fluid from the closed container into the air bag to inflate the air bag. A density sensor within the closed container has a density such that the density sensor floats on the pressurized propellant fluid within the closed container when the fluid has at least the predetermined density, and thus when there is at least the predetermined mass quantity of the propellant fluid in the container. The density sensor sinks into the fluid when the mass quantity is below the predetermined mass quantity, and thus the density of the fluid is less than the predetermined density. A detector monitors the position of the density sensor, and an indicator provides an indication of the monitored position of the density sensor. Thus, if the density sensor sinks into the propellant fluid, the indicator indicates that the air bag system needs servicing.

A further aspect of the present invention is a method of filling a closed container of fixed volume with a predetermined mass quantity of a fluid. A density sensor is provided in the container, the density sensor having a density such that the density sensor floats on the fluid when the fluid has a density corresponding with the predetermined mass quantity in the volume of the closed container, but sinks into the fluid when the fluid has a lower density. The density sensor will thus be adjacent the bottom of the container when the filling process starts. When the container has been filled to the predetermined mass quantity, the density sensor rises to a position adjacent the top of the container. The position of the density sensor is monitored, and when the density sensor rises, the filling is stopped.

BRIEF DESCRIPTION OF THE DRAWINGS

These and other aspects and advantages of the present invention are more apparent from the following detailed description and claims, particularly when considered in conjunction with the accompanying drawings in which like parts bear like reference numerals. In the drawings:

DESCRIPTION OF PREFERRED EMBODIMENTS

Figure 1:
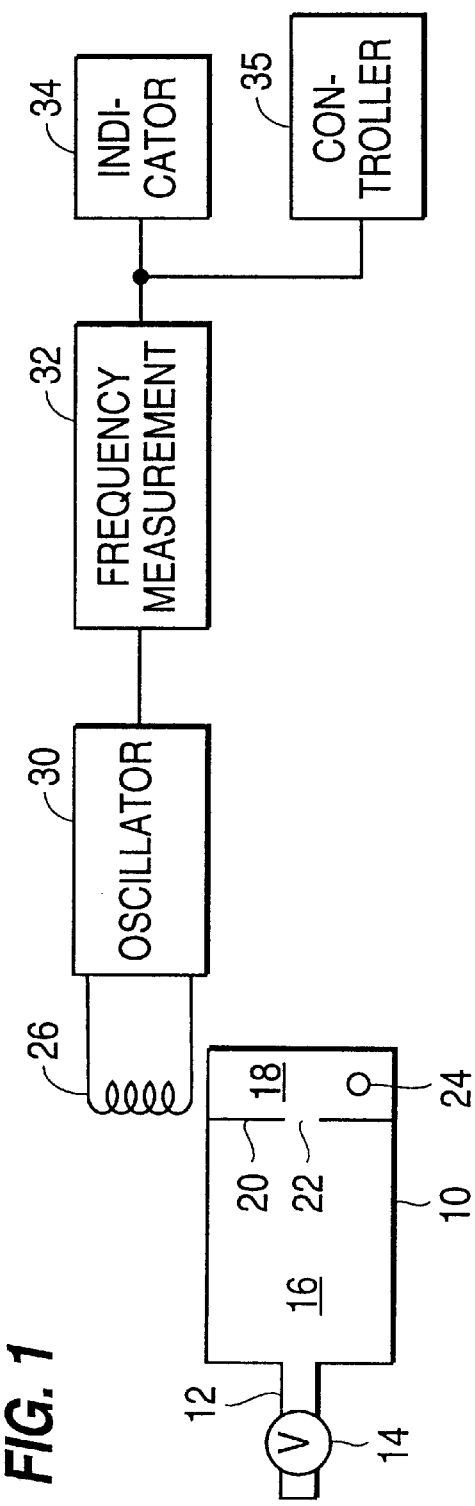
FIG. 1 is a schematic block diagram of a first embodiment of an apparatus in accordance with the present invention for monitoring the mass quantity of a pressurized fluid within a closed container.

FIG. 1 depicts a container 10 having an inlet/outlet 12 which is controlled by a valve 14. When valve 14 is open, fluid can be introduced into or withdrawn from container 10. When valve 14 is closed, container 10 is substantially fluid tight; however, in practice even with valve 14 closed some of the pressurized fluid may leak slowly from container 10.

The interior of container 10 is divided into a main chamber 16 and a sensing chamber 18 by a partition 20, which has an opening 22 permitting fluid flow between chambers 16 and 18. A density sensor 24 is positioned within sensing chamber 18 and is of a size preventing the density sensor from passing through opening 22. Preferably, sensing chamber 18 has a cross section only slightly larger than the cross section of density sensor 24 so as to substantially restrict the movement of the density sensor to the vertical direction.

The fluid to be monitored is introduced through inlet/outlet 12 and valve 14 to the interior of container 10. Initially, density sensor 24 is adjacent the bottom of sensing chamber 18. As the mass quantity of the fluid within the container increases, the density of the fluid increases. When the density of the fluid is greater than the density of density sensor 24, the density sensor floats to a position adjacent the top of sensing chamber 18.

Sensing coil 26 is positioned adjacent the top of sensing chamber 18 and is coupled to oscillator 30 to control the oscillation frequency of the oscillator. Density sensor 24 includes sufficient ferrous material to alter the inductance of coil 26 when the density sensor moves from a position adjacent the bottom of sensing chamber 18 to a position adjacent the top of sensing chamber 18. The oscillation frequency of oscillator 30 is dependent upon the inductance of sensing coil 26, and so the oscillation frequency indicates whether density sensor 24 is adjacent the top of sensing chamber 18 or is adjacent the bottom of chamber 18. Oscillator 30 has its output connected to frequency measurement device 32, the output of which is connected to indicator 34.

Thus, based on the frequency of oscillator 30, as determined by frequency measurement device 32, indicator 34 indicates whether the density of the fluid within container 10 is below or above the density of density sensor 24. If the fluid density is less than the density of density sensor 24, then density sensor 24 is positioned adjacent the bottom of sensing chamber 18, and so has little or no influence on the inductance of coil 26. If the density of the fluid is greater than the density of density sensor 24, then density sensor 24 floats adjacent the top of sensing chamber 18, and so has a greater influence on the inductance of coil 26. The inductance of coil 26, in turn, determines the frequency of oscillator 30. Therefore, indicator 34, although in fact indicating the frequency of oscillator 30, can have a output indicating whether the density of the fluid is below or above the density of density sensor 24. Since the fluid density is proportional to the mass quantity of the fluid within the closed container, indicator 34 can indicate whether the mass quantity is above or below a predetermined level.

Container 10 can be filled with the fluid until density sensor 24 is floating on the fluid. So long as the fluid density is equal to or greater than the density of density sensor 24, the density sensor will continue to float on the fluid. If the fluid density drops below the density of density sensor 24, the density sensor sinks into the fluid. This changes the inductance of sensing coil 26, and so changes the oscillation frequency of oscillator 30. The frequency change is detected by frequency measurement circuit 32, and is indicated by indicator 34. density sensor 24 is selected to have a density such that the density sensor floats on the fluid in closed container 10 when that fluid has at last the predetermined density but sinks into the fluid when the density of the fluid is less than the predetermined density.

Indicator 34 can be any of several types. By way of example, it can be a two state indicator such as a light which is not energized when density sensor 24 is adjacent the top of sensing chamber 18, but is energized to provide an alarm indication when the density sensor is adjacent the bottom of the sensing chamber, thus indicating that the mass quantity of the fluid in container 10 has dropped below an acceptable level. Such a drop might be due to leakage of fluid from container 10.

Alternatively, the apparatus of the present invention can monitor a fluid whose mass quantity, and thus density should be maintained below a predetermined level. In such an application, density sensor 24 has a density such that the density sensor remains adjacent the bottom of sensing chamber 18 so long as the fluid density is below the predetermined density, but rises to a position adjacent the top of sensing chamber 18 when the fluid density increases to a level above the predetermined density. This change in location of density sensor 26 alters the inductance of coil 26 to change the frequency of oscillator 30. When frequency detector 32 detects this change in frequency, the frequency detector provides an output to indicator 34 to indicate the increase in the density, and so the mass quantity, of the fluid within closed container 10. In such an application, indicator 34 might be a light which is energized when density sensor 24 is adjacent the top of sensing chamber 18, but is not energized when the density sensor is adjacent the bottom of the chamber.

Alternatively, or additionally, the output of frequency detector 32 can be used to activate a control device, such as controller 35 in FIG. 1. For example, where the apparatus is monitoring a container of fluid whose density, and thus mass quantity, is to be maintained below a predetermined level, upon detection of an increase in density above that level the output from frequency detector 32 can activate a valve to release some amount of the fluid.

Sensor device 24 is preferably a ball, for example, a hollow ball the interior of which either is evacuated or contains a gas of a lower density than the predetermined density to be sensed. In order to affect sensing coil 26 so as to influence the oscillation frequency of oscillator 30, sensing device 24 must include a ferrous material. The density sensor can be made of a ferrous material. Alternatively, the density sensor might be formed of a non-ferrous material coated with a ferrous coating. Likewise, the density sensor could be formed of a non-ferrous material having a ferrous material incorporated therein. The non-ferrous material could be formed of a polymeric material with the density sensor coated with a hermetically sealing material to prevent entry of the pressurized fluid.

Figure 2:
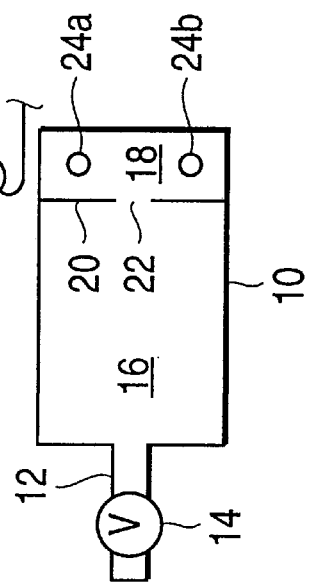
FIG. 2 is a fragmentary schematic diagram of a second embodiment of an apparatus in accordance with the present invention for monitoring the mass quantity of a pressurized fluid within a closed container.

FIG. 2 depicts a modified form of the present invention in which two density sensors 24*a* and 24*b* are provided in sensing chamber 18. The two density sensors have different densities. Thus, as depicted in FIG. 2, density sensor 24*a* has a lower density than density sensor 24*b*. As a consequence, as fluid is introduced into the interior of container 10, the mass quantity of the fluid, and thus the density of the fluid, increases until first density sensor 24*a* rises to a position adjacent the top of sensing chamber 18, and later density sensor 24*b* rises to a position adjacent the top of the chamber. As each density sensor nears the top of sensing chamber 18, the inductance of coil 26 changes. Therefore, oscillator 30 oscillates at a first frequency when the density of the fluid within container 10 is so low that both density sensors 24*a* and 24*b* are adjacent the bottom of sensing chamber 18, at a second frequency when the density is such that density sensor 24*a* is adjacent the top of sensing chamber 18 while density sensor 24*b* remains adjacent the bottom, and at a third frequency when both density sensors are adjacent the top of the sensing chamber. This can be useful in manufacturing or refilling of fluid filled containers. density sensor 24*b* can have a density such that when it floats, so that both density sensors 24*a* and 24*b* are adjacent the top of sensing chamber 18, container 10 has been filled with fluid to the desired level. Filling is then stopped density sensor 24*a* can have a density equal to the minimum acceptable density for the fluid in the container, corresponding with the minimum acceptable mass quantity of the fluid. Thus, upon manufacture or refilling, the container is filled until both density sensors 24*a* and 24*b* are floating adjacent the top of sensing chamber 18. Then if fluid escapes from container 10, or as fluid is utilized from the container, when the fluid density drops to the point that density sensor 24*a* sinks within chamber 18, indicator 34 indicates that the container 10 is no longer acceptable. Density sensor 24*a* thus indicates that excessive fluid has escaped during the life of the container or that the fluid from the container has been utilized to the point that the container should be refilled or removed from service.

Figure 3:
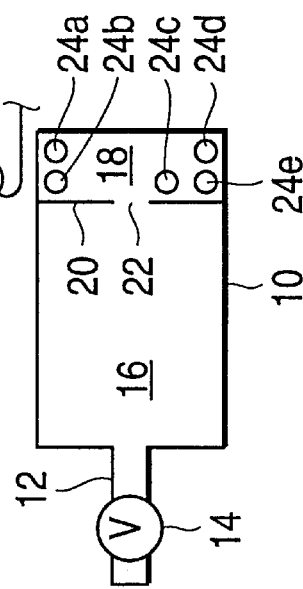
FIG. 3 is a fragmentary schematic diagram of a third embodiment of an apparatus in accordance with the present invention for monitoring the mass quantity of a pressurized fluid within a closed container.

FIG. 3 depicts a further modified embodiment in which a plurality of density sensors, illustratively depicted as five density sensors 24*a*–24*e*, are provided in sensing chamber 18. Each density sensor 24*a*–24*e* has a different density, and so as the mass quantity of the fluid within closed container 10 increases, the number of density sensors floating near the top of chamber 18 increases. Each density sensor that floats increases the effect on the inductance of coil 26, and so increases the effect on the frequency of oscillator 30. Therefore the frequency of the oscillator 30 indicates which of six mass quantity ranges the container contents are in.

Figure 4:
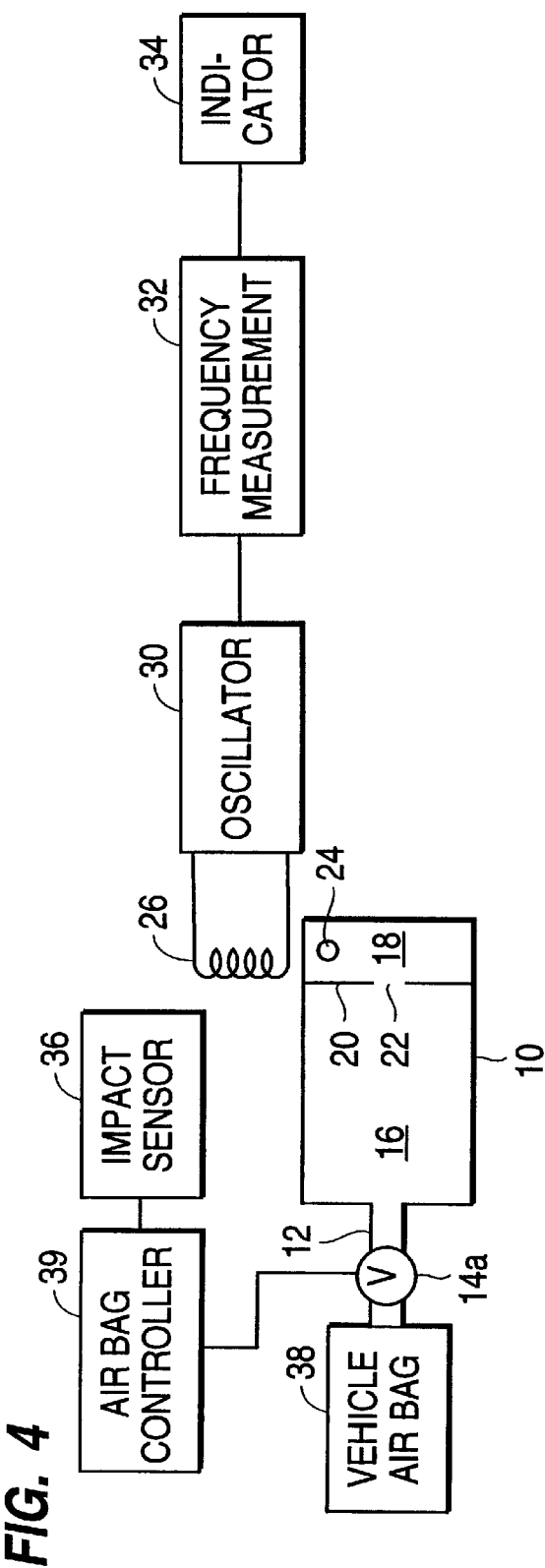
FIG. 4 is a schematic block diagram of a vehicular air bag system in accordance with the present invention, including apparatus for monitoring the mass quantity of the propellant fluid of the air bag system.

FIG. 4 depicts the density monitoring apparatus of FIG. 1 utilized to monitor the propellant gas in a vehicular air bag system. Inlet/outlet 12 of container 10 includes valve 14*a* which couples container 10 to the vehicular air bag 38. Valve 14*a* is controlled by air bag controller 39 and impact sensor 36. Thus, should the vehicle in which the vehicular air bag system is installed be in a collision or suffer other impact, impact sensor 36 applies an input to air bag controller 39 which causes valve 14*a* to open, and the propellant gas within container 10 inflates the air bag 38.

Sensor device 24 senses the density of the propellant gas within container 10, and so controls the oscillation frequency of oscillator 30. So long as the air bag system includes a sufficient mass quantity of propellant gas, density sensor 24*a* floats adjacent the top of sensing chamber 18. If the propellant gas within the container 10 leaks out to a point that the vehicle air bag would not be inflated satisfactorily should an impact occur, the density of the propellant gas drops to the point that density sensor 24 sinks to a position adjacent the bottom of sensing chamber 18. As a consequence, the oscillation frequency of oscillator 30 changes, and indicator 34 is activated. Indicator 34 might be a light on the vehicle dashboard to inform the vehicle operator that the air bag system requires service.

Figure 5:
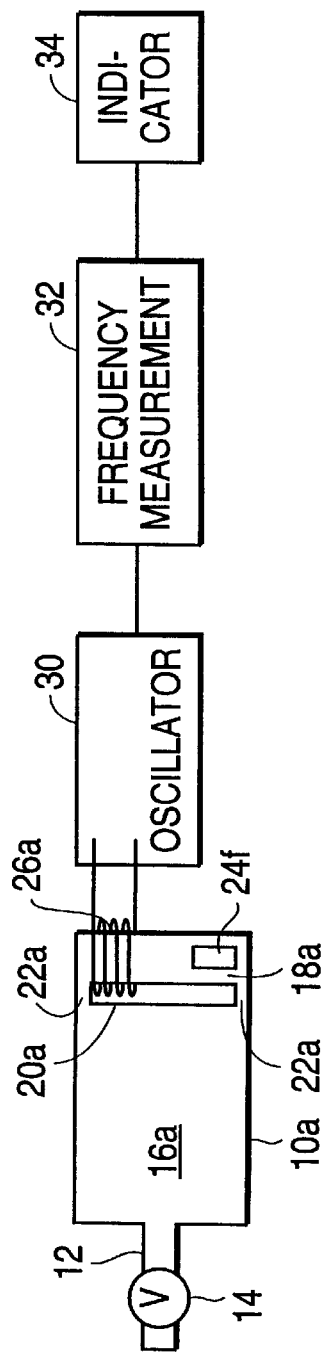
FIG. 5 is a schematic block diagram of a further embodiment of an apparatus in accordance with the present invention for monitoring the mass quantity of a pressurized fluid within a closed container.

A ball-shape is but one form which density sensor 24 might take. By way of example, a circular sieve-like form might be used. Likewise, container 10, with its internal partition 20, is but one form of a container in which the fluid might be held under pressure. A cylindrical container could be utilized with a density sensor of a diameter slightly smaller than the diameter of the container. FIG. 5 depicts a container 10*a* which, in place of an internal partition as in container 10, has a main chamber 16*a* and a sensing chamber 18*a* that are in fluid communication through passages 22*a* on upper and lower ends of an opening 20*a* that passes through the container. Container 10*a* is thus similar to a gallon plastic jug having a hollow handle. Coil 26*a* passes through opening 20*a* to encircle the exterior of sensing chamber 18*a*. density sensor 24*f* is an oblong sensor having a length substantially equal to the vertical distance on sensing chamber 18*a* that is covered by coil 26*a*, and having a width slightly less than the interior cross section of sensing chamber 18*a* so that the longer axis of density sensor 24*f* is maintained substantially vertical. As the mass quantity of the fluid within container 10*a* increases, the fluid density increases, and density sensor 24*f* rises within sensing chamber 18*a*. As the density sensor rises, an increasingly greater number of turns of coil 26*a* encircle the density sensor, causing an increasingly greater effect on the inductance of coil 26*a*. Consequently, as the mass quantity of the fluid within container 10*a* increases, the frequency of oscillator 30 increasingly changes. When density sensor 24*f* is entirely within the turns of coil 26*a*, the oscillator frequency has reached its limit. The changing oscillator frequency is shown on indicator 34, which thus indicates the increasing mass quantity of the fluid within container 10*a*. Alternatively, if fluid escapes from container 10*a*, the fluid density decreases, and density sensor 24*f* drops from within the turns of coil 26*a*. This changes the frequency of oscillator 30.

The present invention, thus, is capable of monitoring the mass quantity and the density of a pressurized fluid in a closed container to provide an indication of a range within which the mass quantity or the density of the fluid comes. The invention includes a method of filling a container with a fluid to a predetermined mass quantity or fluid density. Further, the invention provides a vehicular air bag system capable of providing an indication of a drop in the mass quantity of the air bag propellant to an unacceptable level. Although the present invention has been described with reference to preferred embodiments, various rearrangements, alterations, and substitutions might be made, and still the result would fall within the scope of the invention.

What is claimed is:

1. Apparatus for monitoring the mass quantity of a fluid in a closed container, said apparatus comprising:
   a closed container for holding a predetermined mass quantity of a fluid under a pressure which causes the fluid to have at least a predetermined density;
   a density sensor within said closed container and having a density such that said density sensor moves to a first location within said closed container when the fluid has at least the predetermined density, but moves to a second location within the closed container when the density of the fluid is less than the predetermined density; and
   a detector for monitoring the position of said density sensor within said closed container.

2. Apparatus as claimed in claim 1, in which said closed container includes a main chamber and a sensing chamber, said main chamber and said sensing chamber being in fluid communication with each other, and in which said density sensor is within the sensing chamber.

3. Apparatus as claimed in claim 2, in which said closed container has an internal partition dividing the container interior into the main chamber and the sensing chamber.

4. Apparatus as claimed in claim 1, in which said density sensor comprises a float device.

5. Apparatus as claimed in claim 4, in which said float device comprises a ball.

6. Apparatus as claimed in claim 4, in which said float device is hollow.

7. Apparatus as claimed in claim 6, in which the interior of said hollow float device is evacuated.

8. Apparatus as claimed in claim 6, in which the interior of said hollow float device contains a gas.

9. Apparatus as claimed in claim 4, in which said float device is made of a polymeric material coated with a hermetically sealing material.

10. Apparatus as claimed in claim 4, in which said float device has a density such that said float device floats on the fluid within said closed container when the fluid has a density at least equal to the predetermined density, but sinks into the fluid when the fluid has a density less than the predetermined density.

11. Apparatus as claimed in claim 1, further comprising an indicator responsive to said detector for indicating the monitored position of said density sensor within said closed container.

12. Apparatus as claimed in claim 1, in which:
   said density sensor includes a ferrous material;
   said detector comprises an oscillator circuit having a sensing coil for controlling the frequency of said oscillator circuit in response to the position of said density sensor, and a frequency detector for detecting the frequency of said oscillator.

13. Apparatus as claimed in claim 12, further comprising an indicator responsive to the detected frequency for indicating the position of said density sensor within said closed container.

14. Apparatus as claimed in claim 12, in which said density sensor comprises a ball.

15. Apparatus as claimed in claim 12, in which said density sensor is made of a ferrous material.

16. Apparatus as claimed in claim 12, in which said density sensor is made of a non-ferrous material coated with a ferrous material.

17. Apparatus as claimed in claim 12, in which said density sensor is made of a non-ferrous material having a ferrous material incorporated therein.

18. Apparatus as claimed in claim 12, in which said density sensor is made of a polymeric material coated with a hermetically sealing material.

19. A vehicular air bag system, comprising:
   an air bag;
   an impact sensor;
   a closed container having a fixed volume, for holding a sufficient mass quantity of a pressurized fluid to properly inflate said air bag, said closed container including a valve coupled to said air bag and to said impact sensor and responsive to sensing of an impact by said impact sensor for opening said valve to release the fluid from said closed container into said air bag to inflate said air bag;
   a density sensor within said closed container and having a density such that said density sensor floats on the fluid within said closed container when said closed container is holding at least the sufficient mass quantity of the fluid, but sinks into the fluid when said container is holding less than the sufficient mass quantity of the fluid;
   a detector for monitoring the position of said density sensor within said closed container; and
   an indicator responsive to said detector for indicating the monitored position of said density sensor within said closed container.

20. An air bag system as claimed in claim 19, in which said closed container includes a main chamber and a sensing chamber, the main chamber and the sensing chamber being in fluid communication with each other, and in which said density sensor is within the sensing chamber.

21. An air bag system as claimed in claim 20, in which said closed container has an internal partition dividing the container interior into the main chamber and the sensing chamber.

22. An air bag system as claimed in claim 21, in which said density sensor comprises a ball.

23. An air bag system as claimed in claim 19, in which:
   said density sensor includes a ferrous material;
   said detector comprises an oscillator circuit having a sensing coil for controlling the frequency of said oscillator circuit in response to the position of said density sensor, and a frequency detector for detecting the frequency of said oscillator.

24. A vehicular air bag system, comprising:
   an air bag;
   an impact sensor;
   a closed container having a fixed volume, for holding a predetermined mass quantity of fluid at a pressure causing the fluid to have at least a predetermined density, said closed container including a valve coupled to said air bag and to said impact sensor and responsive to sensing of an impact by said impact sensor for opening said valve to release the fluid from said closed container into said air bag to inflate said air bag;
   a density sensor within said closed container and having a density such that said density sensor floats on the fluid within said closed container when the fluid has at least the predetermined density but sinks into the fluid when the density of the fluid is less than the predetermined density;
   a detector for monitoring the position of said density sensor within said closed container; and
   an indicator responsive to said detector for indicating the monitored position of said density sensor within said closed container.

25. An air bag system as claimed in claim 24, in which said closed container includes a main chamber and a sensing chamber, the main chamber and the sensing chamber being in fluid communication with each other, and in which said density sensor is within the sensing chamber.

26. An air bag system as claimed in claim 25, in which said closed container has an internal partition dividing the container interior into the main chamber and the sensing chamber.

27. An air bag system as claimed in claim 26, in which said density sensor comprises a ball.

28. An air bag system as claimed in claim 24, in which:

said density sensor includes a ferrous material;

said detector comprises an oscillator circuit having a sensing coil for controlling the frequency of said oscillator circuit in response to the position of said density sensor, and a frequency detector for detecting the frequency of said oscillator.

29. A method of filling and utilizing a container of pressurized fluid, the container having a fixed volume, said method comprising the steps of:

(a) providing in the container a first density sensor having a density such that said first density sensor floats on the fluid when the container contains at least a first predetermined mass quantity of the fluid, but sinks into the fluid when the container contains less than the first predetermined mass quantity;

(b) providing in the container a second density sensor having a density such that said second density sensor floats on the fluid when the container contains at least a second predetermined mass quantity of the fluid, less than the first predetermined mass quantity, but sinks into the fluid when the container contains less than the second predetermined mass quantity;

(c) monitoring the position of the first density sensor within the container;

(d) filling container with the fluid until the first density sensor is floating on the fluid;

(e) monitoring the position of the second density sensor within the container; and (f) when the second density sensor sinks into the fluid, activating an indicator.

30. A method as claimed in claim 29, further comprising utilizing fluid from the container while performing step (e).

\* \* \* \* \*